UNITED STATES PATENT OFFICE.

EDGAR ARTHUR ASHCROFT, OF LONDON, ENGLAND.

PROCESS OF FIXATION OF NITROGEN.

1,186,367.  Specification of Letters Patent.  Patented June 6, 1916.

No Drawing.  Application filed December 21, 1914.  Serial No. 878,408.

*To all whom it may concern:*

Be it known that I, EDGAR ARTHUR ASHCROFT, a subject of the King of Great Britain, residing at 99 Buckingham Palace road, in the county of London, and of Plumley, Bovey Tracey, in the county of Devon, England, have invented new and useful Process of Fixation of Nitrogen, of which the following is a specification.

This invention relates to a new and useful process for the fixation of nitrogen in the form of cyanamids, or cyanids, of the alkali metals, or such of the alkaline earth, or other, metals, as will react in a manner analogous to that hereinafter described, the process to which this invention relates being of the kind in which nitrogen, carbon (either as free carbon, or as carbid) and a metal, are caused to react with or without the presence of another metal such as iron and with or without the presence of hydrogen at a temperature preferably below the boiling point of sodium and a pressure considerably above that of the atmosphere.

The cyanamids and the cyanids herein referred to are, in themselves, of great technical importance, but, having regard to the far greater importance of ammonia, and of the alkalis, or other products, which may be derived from cyanamids, or cyanids, my invention also relates to the combination with the above-mentioned manufacture of the further treatment of the resulting cyanamids, or cyanids, to form ammonia and alkalis, (or other metal oxids, hydrates, or carbonates, as the case may be), or of any other derived products according to any known, or suitable, reactions. Without limiting my invention to these materials, or the products thereof, I will describe it with reference to the use of the alkali metals, and more particularly metallic sodium, as the starting point. Other analogous reactions, as far as they are applicable and attainable, will, from this description, be obvious to any one conversant with the manufacture to which this invention relates.

By experiment and research I have found that nitrogen gas can be very readily united with such metals, (for instance sodium), if the operation be carried on in the presence of carbon which may be in any form but is preferably in the form of finely divided charcoal, and also under a pressure much greater than atmospheric pressure and at a suitably adjusted comparatively low temperature, namely, at pressures for example between 50 and 200 atmospheres and upward and at temperatures from about 300° centigrade upward according to the pressure employed. I have found that as a rule the greater the pressure employed the lower the temperature at which the reaction will take place.

I have further found that the first product of such direct synthesis is not, as might have been expected, the normal sodium cyanid, or cyanamid, but a compound hitherto unknown in commerce as an isolated body, and having a formula corresponding to di-sodium cyanid, (or sodium sub-cyanid), that is to say, containing one half the amount of cyanogen, (or in other words double the amount of metal), contained in the normal and well-known sodium cyanid. The normal cyanid is only formed under these conditions by long continued reactions, or at a higher temperature. This reaction (which I will refer to as reaction No. 1) may be expressed thus:—

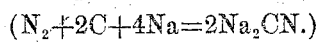

$$(N_2 + 2C + 4Na = 2Na_2CN.)$$

The said product, di-sodium cyanid, is a white substance closely resembling normal sodium cyanid and melting at about the same temperature. In the cold it is highly deliquescent but is stable in dry air and it dissolves in water and decomposes with almost explosive rapidity giving off hydrogen gas and producing a solution of equal molecular proportions of sodium cyanid and sodium hydroxid. It thus behaves as though it were a solution of the metal in the normal cyanid, which however is quite analogous to the known behavior of certain other sub salts, or oxids; for example $Na_4C$ behaves in a similar manner. The said di-sodium cyanid is a strongly reducing substance and will be useful in many arts, or it may be converted into normal sodium cyanid by first treating it with ammonia to form di-sodium cyanamid and afterward heating with carbon at suitably regulated temperatures, of about 500°, and about 800°, centigrade respectively, for the said two reactions, viz., 1st conversion of di-sodium cyanid into di-sodium cyanamid and 2nd conversion of the di-sodium cyanamid to normal sodium cyanid.

I have further found that by mixing with the original charge (for example a charge of sodium in small pieces, or wires, and finely pulverized wood charcoal) or with the product of reaction No. 1 re-pulverized, certain proportions of any suitable catalyzing substance, (for instance finely divided iron which acts well in this connection and is not acted upon by the fused product of the reaction), the reaction, though taking place as aforesaid and at the same temperature, is nevertheless greatly modified by the presence of such catalyzing substance and results under such circumstances in the practically quantitative formation of di-sodium cyanamid according to the following reaction (which I will refer to as reaction No. 2)

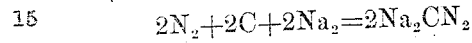
$$2N_2 + 2C + 2Na_2 = 2Na_2CN_2$$

whereby double the quantity of nitrogen is fixed and the whole of the sodium is thus usefully employed, instead of only one half as in the aforesaid reaction No. 1.

The resulting di-sodium cyanamid is a well-known, and highly important, industrial product. It can be converted into normal sodium cyanid by simple fusion with carbon, or into ammonia and sodium carbonate by treatment with steam under pressure, the latter reaction being far more easily carried out than in the case of the analogous, and better known, calcium cyanamid. Also the recovered alkali adds additional value to the sodium, or potassium, products, as compared with the industrial product calcium cyanamid.

In carrying out the aforesaid reactions I prefer to employ hydrogen gas in admixture with the nitrogen. No hydrogen is of course consumed in the aforesaid reactions, but its presence appears to accelerate the reactions. This may be due to a gaseous catalytic action, but is more probably due to its influence upon the equilibrium of the gases in some of the intermediate reactions which may take place in forming the final products.

Both the reactions hereinbefore described are fairly strongly exothermic and both take place at, or about, the same temperature both products fusing also at, or about, the same temperature.

I will now give two examples from my experiments which will further illustrate the nature of this invention. Both these examples I have confirmed many times and the results have practically agreed in all these trials and I have made a great number of other experiments in following up the researches in a variety of directions far too numerous to particularize, but all practically represented by analogy in the following examples. The correct temperatures and pressures and other physical constants and the best method of working under varied conditions as to raw materials and products can readily be found by any one conversant with the manufacture to which this invention relates.

Example 1: It is desired to fix nitrogen in the form of disodium cyanid. The nitrogen is obtained by any known, or suitable, means (for example, liquefaction from air) and should be pure, or nearly pure. Finely divided wood-charcoal and metallic sodium in molecular proportion (for example, 2, molecular equivalents of sodium and 2, to 3, molecular equivalents of wood-charcoal, the charcoal being preferably always in excess for reasons hereinafter explained) are placed in an inner crucible, or pot, of polished iron, or steel, contained in a steel autoclave, or vessel, provided with a cover, inlet and outlet valves, and gages, and capable of withstanding high pressure. The inner crucible, or pot, is separated from the walls of the autoclave by a narrow space filled with gas which equalizes the pressure on the inner pot, and prevents any tendency to force the charge into the pores of the iron, or steel. The inner crucible, or pot, may be removed entire with the charge for recharging and weighing when the treatment is finished. The sodium is cut into small pieces, or is drawn into wires, and mixed intimately with the charcoal and the whole inner crucible, or pot, may be filled therewith. Nitrogen is admitted with about equal volumes of hydrogen all at a pressure of say 75 atmospheres. On heating the autoclave, the pressure, by reason of expansion of the gases, rises to about 200 atmospheres, when the temperature reaches 350° centigrade, and then the reaction begins. The heating may be discontinued and the temperature will automatically rise to about 550° centigrade in a few minutes and will then slowly fall again. The gaseous pressure, which otherwise would fall away continuously by reason of the consumption of the nitrogen, should be kept up by supplying fresh nitrogen at about the working pressure of 200 atmospheres. No fresh hydrogen need be supplied for the reaction, but a small quantity combines with carbon as hereinafter mentioned.

The reaction will be complete in a very short time if the charge be very finely divided and intimately mixed, but will take somewhat longer in its latter stages if the particles be large. If the temperature has not risen above 560° centigrade, or thereabout, the charge is not fused, though the carbon soaks up the more or less plastic salt, producing a loosely agglomerated matrix which can be readily removed from the crucible. If the heat has been raised to over 560° centigrade, the charge is fused and will be white and clean. Any excess carbon if present appears to form some sodium carbid and sinks to the bottom of the melt, its presence being afterward revealed by the formation of a little acetylene when the settlings from the fused product are dissolved in water.

No acetylene appears to be formed from the similar treatment of the clear white di-sodium cyanid forming the upper part of the fused melt. The polished iron, or steel, crucibles and other parts of the apparatus employed for the hereinbefore described operations are absolutely unaffected by the material, or gas, at the low temperatures employed, and may be used again and again without change of their weight and will even retain a polished and untarnished surface after being used many times. The product in this case was 144 grams of di-sodium cyanid mixed with a little of the excess of charcoal employed, but otherwise pure within the limits of a small experiment.

Example 2: Fixing nitrogen in the form of di-sodium cyanamid. The procedure is in all respects the same as in Example No. 1, with the exception that a catalyzer consisting of finely divided iron, (I have obtained excellent results when employing the pulverized and washed residues resulting from the ferro-cyanid process of making normal sodium cyanid wherein the iron is precipitated by metallic sodium), or other metal, or catalyzing substance is intimately mixed with the original charge. The product in this case, if the reaction be complete, is 172 grams of di-sodium cyanamid mixed with any excess of carbon employed. It is either fused, or not, in accordance with what I have before stated, according to the temperature reached.

It is found that the temperature at which these reactions become sufficiently energetic, (or the practical starting temperature of reaction), is higher the less the pressure employed. Thus with 100 atmospheres it appears to be about 380° centigrade, while with 200 atmospheres it is about 350° centigrade. Thus a ready means is presented for regulating the speed and the temperature of reaction and it seems probable that external heating of the vessels may ultimately be dispensed with when using large enough charges, a suitable means being merely provided to start the reaction and the reaction heat doing the rest, regulated by the pressure of the gases admitted.

As an alternative method of practical working it may be convenient to employ the materials in a fused emulsion in the reaction vessel and circulate the gases continually by means of a pump and a pipe dipping into the melt, thus keeping the melt well stirred and bringing the gases more freely into contact with the charge. Or it may be convenient to pack the charcoal in an upright column, or pressure vessel, suitably heated, and to force the molten sodium through it by means of a pump, or squeezing device, the said sodium being carried downward by the pressure of the nitrogen, the charcoal being greatly in excess, and the excess acting as a filter from which emerges the fused product of the reactions which take place during the passage under pressure down the column, or the like. A slightly released pressure at the lower end would be the means of regulating the speed of descent for the molten material the receiving vessel at the bottom being periodically emptied. Or a mechanical device resembling a ball-mill may be employed to insure complete and rapid reaction.

Whatever method of working, or form of apparatus, be employed, the raw materials, the process, and the products, are substantially the same. The further treatment of the products of the aforesaid reactions may be as follows, and may be carried out either in the same, or in a separate, apparatus.

The following operations may be employed as steps in the manufacture of nitrogen products, or of ammonia, or of ammonia and alkalis from alkali metals, nitrogen and carbon.

For the production of other products from the di-sodium cyanid, ammonia may be first employed this reaction taking place at about 500° centigrade.

Reaction No. 3:

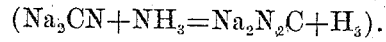

$(Na_2CN+NH_3=Na_2N_2C+H_3)$.

The di-sodium cyanamid may then be utilized as hereinafter stated, or in any known, or suitable, manner. I have further discovered that the di-sodium cyanid may be fused directly with sodium ferro cyanid whereby the following reaction takes place:

Reaction No. 4:

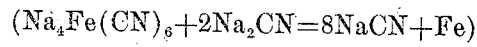

$(Na_4Fe(CN)_6+2Na_2CN=8NaCN+Fe)$ which yields the whole of the cyanogen and the whole of the sodium contained in both products in the valuable form of normal sodium cyanid. This reaction takes place at between 500° and 600° centigrade and the iron residue settles out as in the case of the analogous reaction with metallic sodium and ferro-cyanid. I believe it to be an entirely novel reaction.

For the production of normal sodium cyanid from di-sodium cyanamid the known procedure is to fuse with charcoal at about 750° centigrade. For this reaction the catalyzer, if present, should first be removed by settling in a molten condition in order to avoid a reversal of the reaction which results in the decomposition of the cyanid which, at temperatures at, or about 600° centigrade and upward, is promoted by catalytic substances such, for instance, as iron. The di-sodium cyanamid made by this process will however find a far more extended application in agriculture, or as a source of ammonia, or of dicyandiamid for which purposes it may be used directly on the soil where suitable in the manner of calcium cyanamid, or it may be converted into the latter, or into any other cyanamid form (such as dicyandiamid) by known reactions.

If ammonia and alkali carbonate are to be the end products the sodium cyanamid is preferably treated with steam, or water under pressure. Complete decomposition takes place at, or below, 200° centigrade, and this operation may, if desired, be carried out in the same reaction vessel as that in which the fixation of nitrogen takes place by merely introducing, by sprinkling, for instance, a suitable quantity of water after the nitrogen reaction is finished and while the charge is yet hot. This charge and residue may be washed out and filtered, and the alkali recovered by crystallization, the ammonia being also recovered, in any suitable manner, from the gases, or solution.

By the use of this invention the very advantageous result is obtained of a direct, rapid, and quantitative, synthesis of the three elements metal, carbon, and nitrogen, at temperatures so low as to render the operation economical and easy to carry out. By the simple device of greatly increased gaseous pressures all the difficulties hitherto experienced in attempts to bring about such synthesis are removed.

It is well known that in many processes for making carbids, or nitrids, of metals, or in effecting the synthesis of cyanogen, or cyanids, or cyanamids, by methods hitherto practised, or proposed, very high temperatures, (from 1000°, to 2500°, centigrade), have been employed and at such temperatures many practical difficulties have arisen. Even when rendered practical at all, such processes are expensive, whereas the triple synthesis hereinbefore described takes place at so low a temperature as to be within the resistance range of iron, or steel, vessels and the necessary apparatus becomes both practical and economical. The cost of compressing the gases is trifling and unimportant in the total expense of the process.

When alkali metals are employed for the synthetic process hereinbefore described such metals can be cheaply obtained, for instance, by the processes described in the specification of British Letters Patent Nos. 1001 and 1003 A. D. 1912.

Instead of the separated alkali metals, alloys of such metals with another metal (for example sodium lead alloy) may be used. Or the nascent metal reduced by electrolysis and dissolved in the melt according to the process described in the specification of British Letters Patent 228 A. D. 1910 and 1002 A. D. 1912 may be used, in which case the melt may be circulated simultaneously, or alternately, through the pressure kettle and the secondary cell of the electrolytic apparatus, suitable pipes, pumps, and passages, being arranged for this purpose, and the apparatus being placed in suitable juxtaposition to each other.

As an alternative source of metal, (alkali metal for instance), such metals can be reduced from their oxids, hydrates, or carbonates, and retained by charcoal in excess. Thus, if a body of charcoal be saturated, or mixed, with sodium hydroxid, or with sodium carbonate, either dry, or in solution, and then dried and strongly heated, the charcoal being greatly in excess, free alkali metals, or carbids, or both, will be produced and retained in the mass which may thereafter be caused to react with nitrogen in the hereinbefore described manner and with a like result, at a low temperature, all as hereinbefore described for the free metals.

The explanation of the aforesaid reactions may be sought in several different directions which will at once suggest themselves to the physical chemist and it is not useful, or necessary, herein to elaborate any discussion of the mode of propagation of the reactions. The course of the reactions seem to point to direct triple synthesis in which the presence of all three elements in juxtaposition is necessary. In the reaction No. 1 the fact that a dicyanogen salt, and not cyanamid, is produced, in spite of the low temperature, seems a proof that ammonia is not first produced, (as might be supposed), and then reacting with the metal and carbon produces cyanamid salts, for in that case cyanamid, and not a dicyanid, would be formed. In reaction No. 2, it seems still more probable that ammonia is formed. In that case it is not necessary to attain any great concentration of the ammonia gas and therefore a condition of equilibrium quite unsuitable for the separation of ammonia as such, will suffice for this reaction. I have however found, by experiment, that if the alkali metal be contained in an isolated receptacle and its surface be merely exposed to the gases, while the catalyzer and charcoal are still present in contact also with the gases, practically no reaction will take place and a higher temperature must be employed and the conditions must be substantially altered so as to closely imitate the known conditions for the direct synthesis of ammonia, (see researches of Haber and Le Rossignol Van Ordt and others), which will then react with the alkali metal and carbon, but more slowly, to form cyanamid of the metal.

I am of opinion that the reactions described are a direct triple synthesis the nature of which, in the case of reaction No. 2, is directly modified by the presence of the catalyzer but it is possible of course that the true explanation of the reactions may prove to be other than this; for instance, they may be brought about through the medium of a primary formation of either carbids, nitrids, or hydrids, of the metal, or of cyanogen, or of hydrocyanic acid, or of ammonia. I do not bind myself in any way to the above possible explanations of the phenomena concerning which I am making further researches which may prove of scientific interest, but such researches cannot affect the present invention which is technically complete and fully described herein.

I have found that by substituting coal gas for hydrogen in the above reaction (especially the reaction No. 2) a favorable result is produced, the coal gas contributing some carbon to the reaction. I have also observed that in every case where hydrogen, or coal gas, under pressure is heated with solid charcoal as in the aforesaid experiments some carbon is taken up by the gases. It is therefore necessary for complete reaction either to have an excess of charcoal present in the first instance, or to employ a high carbon gas which will deliver some carbon to the charge. Carbon may also be applied for the aforesaid reactions by the use of any of the various hydrocarbons which are otherwise suitable, for example, benzol, naphthalin, paraffin, acetylene, and the like may be used.

It will of course be obvious that many other metals, and particularly those in the same periodic group as iron, and likewise metals, oxids, and salts, which are known to possess catalytic properties, may be employed in place of iron.

What I claim is—

1. The fixation of nitrogen by reacting nitrogen, carbon and a metal under a pressure of at least fifty atmospheres.

2. The fixation of nitrogen by reacting nitrogen, carbon and a metal under a pressure of at least fifty atmospheres and at a temperature of 300° centigrade and upward.

3. As a new product, di-alkali cyanid, being a white substance resembling sodium cyanid in appearance, highly deliquescent when cold but stable in dry air, dissolving in water with almost explosive rapidity, and having a strong reducing action, substantially as described.

4. The fixation of nitrogen by reacting nitrogen, carbon and alkali metal under a pressure of at least fifty atmospheres.

5. The fixation of nitrogen by reacting nitrogen, carbon and alkali metal under a pressure of at least fifty atmospheres and at a temperature of 300° centigrade and upward.

6. The fixation of nitrogen by reacting nitrogen, carbon, alkali metal and a catalytic metal under a pressure of at least fifty atmospheres.

7. The fixation of nitrogen by reacting nitrogen, carbon and a metal in the presence of hydrogen and under a pressure of at least fifty atmospheres.

8. The fixation of nitrogen by reacting nitrogen, carbon and a metal under a pressure of at least fifty atmospheres, the carbon being present in a quantity in excess of that required for the reaction.

9. The fixation of nitrogen by reacting nitrogen, carbon and a metal under a pressure of at least fifty atmospheres, heating the reaction chamber to a temperature of at least 300° centigrade to start the reaction and permitting the reaction to continue under the exothermic heat resulting from the reaction.

10. The fixation of nitrogen by reacting nitrogen, carbon and a metal under a pressure of at least fifty atmospheres, heating the reaction chamber to a temperature of at least 300° centigrade to start the reaction and permitting the reaction to continue under the exothermic heat resulting from the reaction and continuously supplying nitrogen to the reaction chamber under a pressure commensurate with the rise in pressure due to the progress of the reaction.

In testimony whereof I have signed my name to this specification in the presence of two subscribing witnesses.

EDGAR ARTHUR ASHCROFT.

Witnesses:
GILBERT FLETCHER TYSON,
O. J. WORTH.